(12) United States Patent
Sawada

(10) Patent No.: US 8,014,926 B2
(45) Date of Patent: Sep. 6, 2011

(54) VEHICLE CONTROL DEVICE

(75) Inventor: Hiroyuki Sawada, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 81 days.

(21) Appl. No.: 12/574,049

(22) Filed: Oct. 6, 2009

(65) Prior Publication Data

US 2010/0094516 A1    Apr. 15, 2010

(30) Foreign Application Priority Data

Oct. 10, 2008   (JP) ................................. 2008-264223

(51) Int. Cl.
*G06F 7/00* (2006.01)
(52) U.S. Cl. .......... 701/55; 180/197; 180/248; 180/249; 701/48; 701/56
(58) Field of Classification Search .................. 180/197, 180/248, 249; 475/150, 198, 204; 701/36, 701/48, 55, 56
See application file for complete search history.

(56) References Cited

U.S. PATENT DOCUMENTS

| | | | | |
|---|---|---|---|---|
| 4,615,410 A | * | 10/1986 | Hosaka ........................ | 180/197 |
| 4,773,517 A | * | 9/1988 | Watanabe ..................... | 477/175 |
| 4,962,570 A | * | 10/1990 | Hosaka et al. ............... | 123/399 |
| 5,366,041 A | * | 11/1994 | Shiraishi et al. ............. | 180/248 |
| 5,505,267 A | * | 4/1996 | Orbach et al. .................... | 172/3 |

FOREIGN PATENT DOCUMENTS

JP    2004-90886    3/2004

* cited by examiner

*Primary Examiner* — Khoi Tran
*Assistant Examiner* — Stephen Holwerda
(74) *Attorney, Agent, or Firm* — Oblon, Spivak, McClelland, Maier & Neustadt, L.L.P.

(57) ABSTRACT

A vehicle control device for executing the following control are provided. When a driving mode is input, a CPU of an ECU outputs an instruction for shifting a power transfer mechanism in accordance with the input driving mode, and controls a power control mechanism in accordance with a stored driving mode. When it is determined that shifting of the power transfer mechanism has been completed, the CPU switches the characteristic of the power control mechanism in accordance with the input driving mode. On the other hand, when it is determined that a predetermined period of time has elapsed without completing the shifting from when the instruction for shifting the power transfer mechanism is issued, the CPU maintains the characteristic of the power control mechanism at a characteristic corresponding to the stored driving mode.

4 Claims, 6 Drawing Sheets

| BEFORE SHIFTING | DURING SHIFTING | AFTER SHIFTING | STATUS |
|---|---|---|---|
| NORMAL MODE | NORMAL MODE | NORMAL MODE | TIME OUT |
| | | MOUNTAIN MODE | SHIFTING COMPLETED |

FIG. 5B

| BEFORE SHIFTING | DURING SHIFTING | AFTER SHIFTING | STATUS |
|---|---|---|---|
| SNOW MODE | SNOW MODE | SNOW MODE | TIME OUT |
| | | MOUNTAIN MODE | SHIFTING COMPLETED |

FIG.6

VEHICLE CONTROL DEVICE

INCORPORATION BY REFERENCE

The disclosure of Japanese Patent Application No. 2008-264223 filed on Oct. 10, 2008 including the specification, drawings and abstract is incorporated herein by reference in its entirety.

BACKGROUND OF THE INVENTION

1. Field of the Invention

The invention relates to a vehicle control device that executes electronic control in cooperation with a power transfer mechanism.

2. Description of the Related Art

Generally, a road surface changes more frequently when a vehicle drives on a bad road (hereinafter, referred to as "off road") than when the vehicle drives on a paved road (hereinafter, referred to as "on road"), so large variations occur in the driving condition of the vehicle.

For example, when the vehicle drives on a snow-covered road surface having a small friction coefficient among off roads, an appropriate torque cannot be obtained when a torque is generated in accordance with a throttle characteristic similar to that of the on road to cause a slip, or the like, to occur. Thus, it is difficult to obtain desired driving capability.

In addition, in a case where a four-wheel drive vehicle runs on a rugged mountain road, for example, when a left rear wheel is not in contact with a ground and the other three drive wheels are in contact with the ground, the rotational resistance of the left rear wheel steeply decreases. Therefore, owing to the function of a differential mechanism, which serves as a differential unit, provided for the vehicle, the power of an engine is intensively transferred to the left rear wheel that is not in contact with the ground, so the rotational speed of the left rear wheel remarkably increases, and it becomes difficult for the power to be transferred to the other three drive wheels that are in contact with the ground.

In this way, when the left rear wheel, of which the rotational speed has remarkably increased, contacts the ground again, because the power of the left rear wheel is larger than the power of each of the right rear wheel and front wheels, so the traveling direction of the vehicle deviates rightward. As such a phenomenon alternately and successively occurs in the left and right wheels, fishtail occurs. Therefore, it is difficult to obtain desired driving capability.

Thus, as described above, variations in the vehicle driving condition due to a change of a road surface are more frequent when the vehicle drives on an off road than when the vehicle drives on an on road, so it is necessary to control the vehicle differently when the vehicle drives on an off road from when the vehicle drives on an on road.

Then, there has been suggested a vehicle control device that maintains good driving capability while driving on various types of off roads. The above vehicle control device defines the slip ratio of each drive wheel by a difference between the rotational speed of each drive wheel and the traveling speed of the vehicle, and, when the slip ratio of any of the drive wheels is higher than a predetermined value, applies braking force to that drive wheel. Thus, a drive wheel that is not in contact with a ground surface and has a high slip ratio is braked to suppress idle rotation, so owing to the function of a differential mechanism, power is desirably transferred to the drive wheels that are in contact with the ground surface to improve off road driving capability (for example, see Japanese Patent Application Publication No. 2004-90886 (JP-A-2004-90886)).

In addition, for a power control mechanism, such as an electronically controlled throttle and an automatic transmission, there has been suggested a technique that is able to change a driving mode in accordance with a road surface. For example, there is a technique that, when the vehicle drives on a snow-covered road surface, the rate of change of the opening degree of the electronically controlled throttle with respect to the operation amount of an accelerator pedal is decreased as compared with that when the vehicle drives on an on road.

In this way, in some of the existing four-wheel drive vehicles, an ECU controls shifting of a power control mechanism, such as adjustment of the opening degree of a throttle valve and shifting of the speed ratio of a transmission. In some of the above four-wheel drive vehicles, a driver manually operates to mechanically perform shifting of a power transfer mechanism, such as shifting between the lock and free of a differential mechanism and shifting between the high-speed gear and low-speed gear of a transfer that serves as a power transfer device.

However, in order to improve off-road driving capability, the power transfer mechanism and the power control mechanism need to be integrally controlled in accordance with a road surface condition. If the above mechanisms are separately controlled, it is difficult to obtain desired driving capability, causing a driver to feel discomfort.

Then, in order to integrally control the power transfer mechanism and the power control mechanism in accordance with a road surface condition, there is a conceivable manner that the ECU collectively controls the power transfer mechanism and the power control mechanism.

However, in the existing four-wheel drive vehicles, when it is attempted to control the power transfer mechanism and the power control mechanism by the ECU, it requires a big design change in order to allow the ECU to perform shifting of the differential mechanism and shifting of the transfer, which have been mechanically performed so far. This problematically increases additional cost.

In addition, in order to retrofit the above function to the existing four-wheel drive vehicle at low cost without a big design change, it is desirable to provide a vehicle control device that shifts a driving mode in such a manner that, in accordance with a driving mode input by the driver, the ECU shifts the power control mechanism and the driver is instructed to mechanically shift the power transfer mechanism. However, when the power control mechanism is shifted in accordance with the intended driving mode before completion of shifting of the power transfer mechanism, and when the driving mode returns to the original one because shifting of the power transfer mechanism has not been completed within a certain period of time, the power control mechanism needs to be shifted to the original state again. This problematically causes an unnecessary shift of control and, as a result, deteriorates drivability.

SUMMARY OF THE INVENTION

The invention provides a vehicle control device that prevents deterioration of drivability caused by an unnecessary shift of control during shifting of a driving mode in accordance with a road surface condition and that execute electronic control in cooperation with a power transfer mechanism without increasing cost as compared with an existing vehicle.

A first aspect of the invention provides a vehicle control device. The vehicle control device includes: a power control mechanism that controls a state of power transmitted from an engine and a state of power generated by the engine; a power transfer mechanism that shifts distribution of power from the engine and that shifts whether to allow differential motion of each drive wheel; a first control unit that has a plurality of control modes and that selects any one of the control modes from among the plurality of control modes to control the power control mechanism in accordance with the selected control mode; a second control unit that has a plurality of operation modes and that selects any one of the operation modes from among the plurality of operation modes in accordance with input shift operation to control the power transfer mechanism in accordance with the selected operation mode; an operation mode shifting device that is used to input the shift operation for shifting the operation modes; and a third control unit that allows a vehicle driving mode, formed of any one of the operation modes and any one of the control modes, to input, that outputs a shift instruction for performing the shift operation for shifting any one of the operation modes into another one of the operation modes corresponding to the input vehicle driving mode, and that determines whether the shift operation for shifting the power transfer mechanism into the operation mode corresponding to the input vehicle driving mode has been input through the operation mode shifting device. The first control unit selects any one of the control modes corresponding to the input vehicle driving mode, and, when the third control unit determines that the shift operation for shifting into the operation mode corresponding to the input vehicle driving mode has been input through the operation mode shifting device and when the second control unit has completed shifting the power transfer mechanism into the operation mode corresponding to the input vehicle driving mode, the first control unit shifts any one of the control modes into the control mode corresponding to the input vehicle driving mode, and, until the third control unit determines that the shift operation for shifting the operation modes has been input, the first control unit maintains the control mode at a time of input of the vehicle driving mode.

With the above vehicle control device, the current control mode at the time when the vehicle driving mode is input is maintained until shift operation of the power transfer mechanism has been completed. Thus, it is possible to prevent deterioration of drivability by preventing an unnecessary shift of control. In addition, by instructing a driver to shift the power transfer mechanism, it does not require a big design change in order to shift the power transfer mechanism through electronic control. This can suppress an increase in production cost, and the vehicle control device may be retrofitted to an existing four-wheel drive vehicle at low cost.

In addition, in the above vehicle control device, when the third control unit determines that the shift operation for shifting into the operation mode corresponding to the input vehicle driving mode has not been input through the operation mode shifting device within a predetermined period of time from when the shift instruction is output by the third control unit, the first control unit may invalidate the input vehicle driving mode.

With the above configuration, when shift operation for shifting into the operation mode corresponding to the driving mode input through the driving mode input device has not been performed within the predetermined period of time, the input driving mode is invalidated. Thus, it is possible to prevent deterioration of drivability by preventing an unnecessary shift of control that is not intended by a driver.

In addition, in the above vehicle control device, the power control mechanism may include an automatic transmission that reduces or increases a rotational speed of an output shaft of the engine, which is input by selecting any one of a plurality of power transmission paths from the engine, to transmit the rotational speed to drive wheels; and a throttle that changes a flow rate of air supplied to the engine.

With the above vehicle control device, until shift operation for shifting the power transfer mechanism is input through the operation mode shifting device, the automatic transmission and the throttle are controlled in accordance with the currently set control mode at the time when the vehicle driving mode is input. Thus, it is possible to prevent deterioration of drivability by preventing an unnecessary shift of control. In addition, by instructing a driver to shift the power transfer mechanism, it does not require a big design change in order to shift the power transfer mechanism through electronic control. This can suppress an increase in production cost, and the vehicle control device may be, for example, retrofitted to an existing four-wheel drive vehicle at low cost.

Furthermore, in the above vehicle control device, the power transfer mechanism may include a transfer that distributes power, generated by the engine, between front wheels and rear wheels so as to allow differential motion and that reduces or increases an input rotational speed of an output shaft of the engine to transmit the rotational speed to the drive wheels; and a differential mechanism that distributes the power between left and right drive wheels so as to allow differential motion.

With the above vehicle control device, until shift operation for shifting the transfer and the differential mechanism is input through the operation mode shifting device, the automatic transmission and the throttle are controlled in accordance with the currently set control mode at the time when the vehicle driving mode is input. Thus, it is possible to prevent deterioration of drivability by preventing an unnecessary shift of control. In addition, by instructing a driver to shift the transfer and the differential mechanism, it does not require a big design change in order to shift the transfer and the differential mechanism through electronic control. This can suppress an increase in production cost, and the vehicle control device may be, for example, retrofitted to an existing four-wheel drive vehicle at low cost.

According to the aspects of the invention, it is possible to provide a vehicle control device that prevents deterioration of drivability and that execute electronic control in cooperation with a power transfer mechanism without increasing cost as compared with an existing vehicle.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
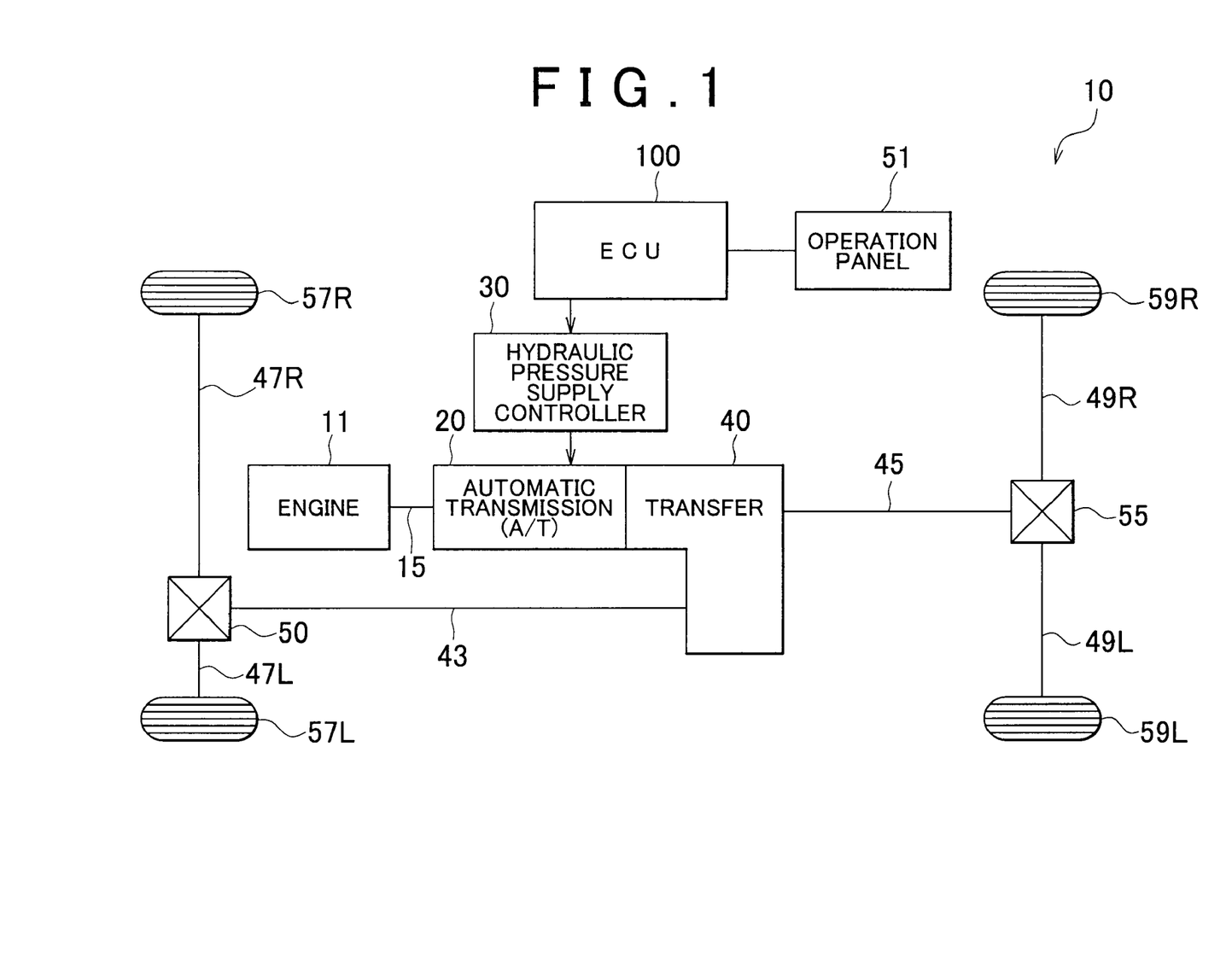
FIG. 1 is a schematic block diagram of a vehicle equipped with a vehicle control device according to an embodiment of the invention.

Hereinafter, an embodiment of the invention will be described with reference to the accompanying drawings. First, the configuration of a vehicle equipped with a vehicle control device according to the embodiment of the invention will be described with reference to FIG. 1. FIG. 1 is a schematic block diagram of the vehicle equipped with the vehicle control device according to the embodiment of the invention.

The vehicle 10 shown in FIG. 1 is a four-wheel drive vehicle (4WD). Note that the vehicle control device according to the aspect of the invention may be equipped for a vehicle other than a four-wheel drive vehicle.

As shown in FIG. 1, the vehicle 10 according to the present embodiment includes an engine 11, a crankshaft 15, an automatic transmission (A/T) 20, a hydraulic pressure supply controller 30, a transfer 40, a front propeller shaft 43, a rear propeller shaft 45, a front differential mechanism 50, a rear differential mechanism 55, front drive shafts 47L and 47R, rear drive shafts 49L and 49R, front wheels 57L and 57R and rear wheels 59L and 59R. The engine 11 serves as a power source. The crankshaft 15 serves as an output shaft and transmits power generated by the engine 11. The A/T 20 transmits the power generated by the engine 11 and selects a speed ratio in accordance with the driving condition of the vehicle 10. The hydraulic pressure supply controller 30 is used to control the A/T 20 by hydraulic pressure. The transfer 40 distributes the power, transmitted by the A/T 20, between a front wheel side and a rear wheel side. The front propeller shaft 43 transmits the power, distributed from the transfer 40, to the front wheel side. The rear propeller shaft 45 transmits the power, distributed from the transfer 40, to the rear wheel side. The front differential mechanism 50 transmits the power transmitted from the front propeller shaft 43. The rear differential mechanism 55 transmits the power transmitted from the rear propeller shaft 45. The front drive shafts 47L and 47R serve as drive shafts and transmit the power transmitted from the front differential mechanism 50. The rear drive shafts 49L and 49R serve as drive shafts and transmits the power transmitted from the rear differential mechanism 55. The front wheels 57L and 57R serve as drive wheels and rotate by the power transmitted from the front drive shafts 47L and 47R to drive the vehicle 10. The rear wheels 59L and 59R serve as drive wheels and rotate by the power transmitted from the rear drive shafts 49L and 49R to drive the vehicle 10.

Here, the vehicle 10 includes an ECU 100. The ECU 100 serves as a vehicle electronic control unit and collectively controls the vehicle 10 overall. In addition, the vehicle 10 includes various sensors (not shown). The various sensors are configured to input detected signals to the ECU 100.

In addition, the vehicle 10 includes a throttle valve (not shown) in an intake system that supplies combustion air to the engine 11. The throttle valve is used to adjust the flow rate of the combustion air. The throttle valve is controlled to a predetermined opening degree by the ECU 100 on the basis of the operation amount of an accelerator pedal.

The engine 11 is formed of a known internal combustion engine that combusts an air-fuel mixture of air and hydrocarbon fuel, such as gasoline and light oil, in a combustion chamber of a cylinder (not shown) to output power. The engine 11 intermittently repeats combustion of an air-fuel mixture in the combustion chamber to reciprocally move a piston in the cylinder to thereby rotate the crankshaft 15 coupled to the piston so as to be able to transmit power, thus transmitting power to the A/T 20. Note that fuel used in the engine 11 may be alcohol fuel that contains alcohol, such as ethanol.

The A/T 20 includes a plurality of planetary gear sets (not shown). These planetary gear sets include clutches and brakes, as a plurality of frictional elements, that are controlled for engagement by hydraulic actuators.

In addition, these clutches and brakes each establish any one of an engaged state and a released state in accordance with excitation or de-excitation of transmission solenoids and linear solenoids of the hydraulic pressure supply controller 30 and a state of a hydraulic circuit switched by a manual valve. Thus, the A/T 20 establishes a speed ratio in accordance with a combination of the engaged states and released states of these clutches and brakes.

With the above configuration, the A/T 20 is a stepped transmission that reduces or increases the rotational speed of the crankshaft 15, input as the power of the engine 11, at a predetermined speed ratio γ and transmits the power to the transfer 40. The A/T 20 establishes a speed ratio in accordance with a driving condition, and converts the speed in accordance with each speed ratio. Note that the A/T 20 may be formed of a continuously variable transmission that continuously varies a speed ratio.

The hydraulic pressure supply controller 30 includes a plurality of transmission solenoids S, a linear solenoid SLT and a linear solenoid SLU. The hydraulic pressure supply controller 30 is controlled by the ECU 100 to control the A/T 20 by hydraulic pressure. The plurality of transmission solenoids S are operated when the A/T 20 shifts speed ratios to one another. The linear solenoid SLT is configured to carry out line pressure control and back pressure control for an accumulator (not shown).

In addition, in accordance with the operated states of the plurality of transmission solenoids S, the linear solenoid SLT and the linear solenoid SLU, the plurality of frictional elements of the A/T 20 are selectively engaged or released by hydraulic pressure that uses line pressure as source pressure. The hydraulic pressure supply controller 30 causes the A/T 20 to establish a desired speed ratio by a combination of engagement and release of these frictional elements.

The transfer 40 is also called an auxiliary transmission, and is able to distribute power, transmitted from the A/T 20, between the front propeller shaft 43 and the rear propeller shaft 45. For example, when the vehicle 10 is a rear wheel drive-based 4WD that drives using the rear wheels 59L and 59R as drive wheels during normal driving, the transfer 40 transmits power, transmitted from the A/T 20, to the rear propeller shaft 45 only during normal driving, while the transfer 40 distributes power, transmitted from the A/T 20, between the front propeller shaft 43 and the rear propeller shaft 45 when the vehicle 10 drives in a four wheel drive mode.

In addition, the transfer 40 includes a known shift mechanism for shifting between a rear wheel drive mode and a four wheel drive mode. The transfer 40 also includes a known speed reduction mechanism and a center differential mechanism. The speed reduction mechanism transmits the rotation of an input shaft (not shown), input as power, to the front propeller shaft 43 and the rear propeller shaft 45 at a predetermined speed reduction ratio. The center differential mechanism allows a difference between the rotational speed of the front wheels 57L and 57R and the rotational speed of the rear wheels 59L and 59R. Note that the center differential mechanism may be the one that can prohibit a difference between the rotational speed of the front wheels 57L and 57R and the rotational speed of the rear wheels 59L and 59R (center differential locked state).

The rear differential mechanism 55 includes a plurality of gears. The rear differential mechanism 55 transmits the power of the engine 11, transmitted through the rotation of the rear propeller shaft 45, to the rear wheels 59L and 59R by rotating the rear drive shafts 49L and 49R. In addition, the rear differential mechanism 55 allows a difference in rotational speed between the rear wheel 59L and the rear wheel 59R when the vehicle 10 drives at a curve, or the like, in such a manner that the plurality of these gears are engaged with one another. Furthermore, the rear differential mechanism 55 is able to prohibit the above difference in rotational speed (rear differential locked state).

Note that the front differential mechanism 50 has a substantially similar configuration to that of the rear differential mechanism 55, so the description thereof is omitted.

The front wheels 57L and 57R and the rear wheels 59L and 59R respectively rotate by power transmitted from the front drive shafts 47L and 47R and the rear drive shafts 49L and 49R, and drive the vehicle 10 by frictional action with a road surface.

The ECU 100 includes a central processing unit (CPU), an electrically erasable and programmable read only memory (EEPROM) formed of a rewritable nonvolatile memory, a random access memory (RAM) that temporarily stores data, and an input/output interface circuit (none of them are shown in the drawing).

Furthermore, the vehicle 10 is equipped with an operation panel 51 in a vehicle cabin (not shown). The operation panel 51 is connected to the ECU 100. As a driver, for example, inputs a driving mode by a switch, or the like, provided on the operation panel 51, a signal that indicates an input driving mode is input to the input interface of the ECU 100.

Figure 2:
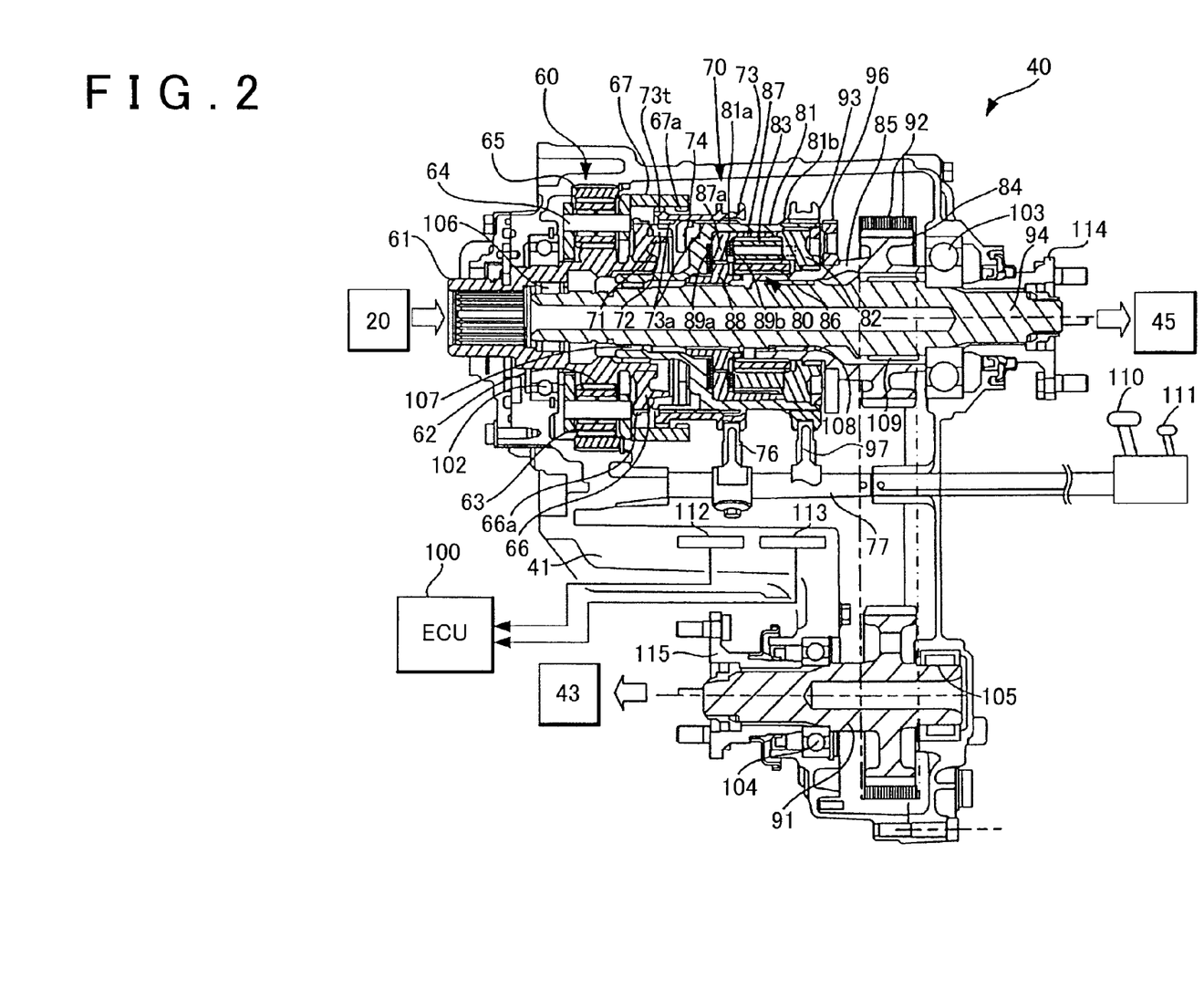
FIG. 2 is a schematic diagram that shows the configuration of a transfer according to the embodiment of the invention.

Next, the configuration of the transfer 40 will be described with reference to the accompanying drawings. FIG. 2 is a schematic diagram that shows the configuration of the transfer according to the embodiment of the invention. First, the transfer 40 will be schematically described. As shown in FIG. 2, the transfer 40 is serially arranged downstream of the A/T 20 so as to transmit power, transmitted from the engine 11 via the A/T 20, to the front propeller shaft 43 and the rear propeller shaft 45.

In addition, the transfer 40 is able to shift between a high-speed gear (Hi) and a low-speed gear (Lo). The transfer 40 includes an auxiliary transmission 60 and a center differential mechanism 80. The auxiliary transmission 60 has a synchronization mechanism 70 at an operating portion thereof for shifting. The center differential mechanism 80 is formed of a planetary gear-type differential gear unit with differential limiting function.

The auxiliary transmission 60 is a planetary gear transmission that includes a sun gear 62, a plurality of pinions 63 and a ring gear 65. The sun gear 62 is formed of an external gear formed integrally with a cylindrical input shaft 61 that is spline-fitted to an output shaft (not shown) of the A/T 20. The plurality of pinions 63 are arranged on the outer circumference of the sun gear 62. The ring gear 65 is fixed to the inside of a transfer case 41 so that the plurality of pinions 63 are in mesh with the ring gear 65. The auxiliary transmission 60 is able to output power, reduced in speed, from a cylindrical member 67 fixed to a carrier 64. The power reduced in speed is obtained so that, as an input shaft 61 makes multiple turns, for example, makes 2.6 turns, the carrier 64 makes one turn. The cylindrical member 67 has a spline tooth 67a at its distal end on the inner peripheral side.

In addition, a high-speed-gear toothed wheel 66 is fixed to the inner end (the other end) of the input shaft 61. The toothed wheel 66 outputs the rotation, input from the input shaft 61, at an equal speed (a speed ratio of 1 to 1). Note that each gear of the auxiliary transmission 60 is, for example, formed of a helical gear.

The synchronization mechanism 70 is a so-called lever synchro mechanism. The synchronization mechanism 70 includes a taper ring 71, a synchronizer ring 72, a shift sleeve 73, a synchro lever 74, a shift fork 76, and an operating shaft 77. The taper ring 71 is integrally provided on the inner side surface of the toothed wheel 66. The synchronizer ring 72 is arranged adjacent to the taper ring 71. The switching sleeve 73 serves as a synchro sleeve and is arranged coaxially with the input shaft 61. The synchro lever 74 is loosely fitted at its outer peripheral portion to an annular groove (no reference numeral is assigned) formed at an axially center inner peripheral portion of the shift sleeve 73, and is elastically supported at its inner peripheral portion by a leaf spring, or the like. The shift fork 76 is used to shift between the high-speed gear and the low-speed gear. The shift fork 76 is fitted to the shift sleeve 73 to axially displace the shift sleeve 73. The operating shaft 77 supports the shift fork 76 and is supported by the transfer case 41 so as to be axially slidable. The shift sleeve 73 has two pairs of spline teeth 73a that are formed on the inner peripheral portion and axially spaced apart from each other. The above annular groove is formed between the two pairs of spline teeth 73a.

In addition, a spline tooth 73t that can be fitted to the spline tooth 67a of the cylindrical member 67 is provided on the outer periphery at the outer end portion of the shift sleeve 73. As the shift sleeve 73 is disengaged from the spline tooth 66a of the toothed wheel 66 to move rightward in the drawing, the shift sleeve 73 is spline-fitted to the cylindrical member 67 by the spline tooth 73t and the spline tooth 67a so as to be integrally rotatable in the same direction.

The center differential mechanism 80 includes a housing 81, a cap-shaped pinion carrier 82, a plurality of pinions 83, a front output member 85, a sun gear 86, a ring gear 87, an inner cylindrical member 88, and shims 89a and 89b. The housing 81 is rotatably supported by an output shaft 94 arranged coaxially with the input shaft 61, and is spline-fitted at the outer peripheral portion thereof to the inner peripheral portion of the shift sleeve 73. The pinion carrier 82 is spline-fitted to and retained by the inner peripheral portion of the housing 81 at one end, and is rotatably supported by the output shaft 94 via a bearing. The plurality of pinions 83 are rotatably supported by the pinion carrier 82 and are arranged at equal intervals around the output shaft 94. The plurality of pinions 83 are, for example, formed of helical gears. The front output member 85 is integrally connected to a front-drive chain sprocket 84, and is rotatably supported by the output shaft 94. The sun gear 86 is spline-fitted to the front output member 85, and has external teeth that are in mesh with the pinions 83. The ring gear 87 has internal teeth that are in mesh with the plurality of pinions 83 and an annular plate portion 87a that faces one ends of the plurality of pinions 83. The inner cylindrical member 88 is spline-fitted to the annular plate portion 87a of the ring gear 87 and is spline-fitted to the output shaft 94. The shims 89a and 89b are respectively provided between the annular plate portion 87a of the ring gear 87 and the housing 81 and between the annular plate portion 87a of the ring gear 87 and the plurality of pinions 83.

Note that the chain sprocket 84 is coupled to a driven-side chain sprocket 91 by a chain 92, and rotates the front propeller shaft 43 via the chain sprocket 91. In addition, the output shaft 94 is coupled to the rear propeller shaft 45. Note that, as the shift sleeve 73 moves rightward in the drawing, the shift sleeve 73 is fitted at the inner peripheral portion thereof to a spline tooth 81a of the housing 81 to thereby spline-fit the shift sleeve 73 to the housing 81 so as to be integrally rotatable in the same direction.

In the center differential mechanism 80, as the orbital motion of the pinions 83 is input from the housing 81 via the pinion carrier 82, the rotating motion is transmitted from the sun gear 86 to the front output member 85, while rotation is transmitted from the ring gear 87 to the output shaft 94 via the inner cylindrical member 88. This allows differential motion between the front-drive chain sprocket 84 that integrally rotates with the sun gear 86 and the output shaft 94 that integrally rotates with the ring gear 87.

In addition, the center differential mechanism 80 uses the thrust force applied to the pinions 83 formed of helical gears to press the annular plate portion 87a of the ring gear 87 toward the inner wall of the housing 81. By so doing, the differential motion may be limited within a predetermined range.

A spline tooth 81b is formed on the outer peripheral portion of the housing 81 at one end, and a differential lock shifting sleeve 93 is fitted to the spline tooth 81b. When the sleeve 93 is spline-fitted to the toothed wheel 96 that is fixedly connected to the chain sprocket 84 and the front output member 85, the sleeve 93 couples the housing 81 of the center differential mechanism 80 to the chain sprocket 84 so as to be integrally rotatable in the same direction, thus making it possible to prohibit differential motion between the chain sprocket 84 and the ring gear 87 and between the chain sprocket 84 and the output shaft 94. The state where the differential motion is prohibited is termed a center differential locked state.

As described above, the center differential locked state prohibits differential motion between the chain sprocket 84, which is a power transmission device to the front propeller shaft 43, and the output shaft 94, which is a power transmission device to the rear propeller shaft 45. This prohibits differential motion between the front wheels 57L and 57R and the rear wheels 59L and 59R. Thus, a rigid four wheel drive state is attained. Thus, even when the vehicle 10 drives on a rugged off road such that the front wheels 57L and 57R or the rear wheels 59L and 59R are intermittently spaced apart from a ground, power is desirably transmitted also to wheels other than the wheels spaced apart from the ground. Thus, it is possible to improve driving capability.

Here, the operating shaft 77 is axially split into two or formed of two shafts. One of the shafts supports the shift fork 76, and the other shaft supports a shift fork 97.

A fitting bracket 114 for attachment to the rear propeller shaft 45 is fixed to the output shaft 94. In addition, a fitting bracket 115 for attachment to the front propeller shaft 43 is fixed to the driven-side chain sprocket 91.

Furthermore, bearings 102, 103 and 104 each are formed of a ball bearing, and bearings 105, 106, 107, 108 and 109 each are formed of a roller bearing or a needle bearing.

In addition, a high-low shift lever 110 and a center differential lock shift lever 111 are connected to the transfer 40 by a mechanical structure (not shown). The high-low shift lever 110 and the center differential lock shift lever 111 are provided in the vehicle cabin.

The transfer 40 shifts between a high-speed gear and a low-speed gear in response to the high-low shift lever 110 operated by a driver. Specifically, when the high-low shift lever 110 is operated to the high-speed gear side, the transfer 40 moves the operating shaft 77, which supports the shift fork 76, and the shift fork 76 leftward in the drawing. By so doing, the shift fork 76 moves the shift sleeve 73 leftward in the drawing. As the spline tooth 73a of the shift sleeve 73 is spline-fitted to the spline-tooth 66a of the toothed wheel 66 so as to be integrally rotatable in the same direction, rotation of the input shaft 61 is transmitted to the shift sleeve 73 at an equal speed (a speed ratio of 1 to 1), and then to the center differential mechanism 80 at an equal speed via the shift sleeve 73. Thus, the high-speed gear (Hi) is obtained. Note that, until the spline tooth 66a of the toothed wheel 66 is completely spline-fitted to the spline tooth 73a of the shift sleeve 73, the synchro lever 74 is pressed against the synchronizer ring 72 as the shift sleeve 73 moves to be synchronized so that the rotational speed of the shift sleeve 73 approaches the rotational speed of the toothed wheel 66.

On the other hand, when the high-low shift lever 110 is shifted to the low-speed gear side, the transfer 40 moves the operating shaft 77, which supports the shift fork 76, and the shift fork 76 rightward in the drawing. By so doing, the shift fork 76 moves the shift sleeve 73 rightward in the drawing, the spline tooth 67a of the cylindrical member 67 is fitted to the spline 73t of the shift sleeve 73 so as to be integrally rotatable in the same direction, and, in addition, the spline tooth 73a of the shift sleeve 73 is fitted to the spline tooth 81a of the housing 81 so as to be integrally rotatable in the same direction. Thus, rotation of the input shaft 61, of which the speed is reduced by the auxiliary transmission 60, is transmitted to the center differential mechanism 80 via the cylindrical member 67 and the shift sleeve 73. Thus, the low-speed gear is obtained.

In addition, when the center differential lock shift lever 111 is shifted to a position corresponding to the center differential locked state, the transfer 40 moves the operating shaft 77, which supports the shift fork 97, and the shift fork 97 rightward in the drawing. By so doing, the differential lock shifting sleeve 93 is spline-fitted to the toothed wheel 96, and the housing 81 of the center differential mechanism 80 is fitted to the chain sprocket 84 so as to be integrally rotatable in the same direction. Thus, the above described center differential locked state is attained.

Furthermore, when the center differential lock shift lever 111 is shifted to a position corresponding to a state where the center differential locked state is released (center differential free state), the transfer 40 moves the operating shaft 77, which supports the shift fork 97, and the shift fork 97 leftward in the drawing. By so doing, spline fit between the differential lock shifting sleeve 93 and the toothed wheel 96 is released to attain the center differential free state.

Here, the transfer 40 is provided with a high-low shift sensor 112 and a center differential lock shift sensor 113. The high-low shift sensor 112 detects the position of the shift fork 76, and inputs the detected signal that indicates the position of the shift fork 76 to the input interface of the ECU 100. In addition, the center differential lock shift sensor 113 detects the position of the shift fork 97, and inputs the detected signal that indicates the position of the shift fork 97 to the input interface of the ECU 100.

Thus, the ECU 100 determines whether the gear of the transfer 40 is Hi (high-speed gear) or Lo (low-speed gear) on the basis of the position of the shift fork 76 indicated by the detected signal input from the high-low shift sensor 112. Furthermore, the ECU 100 determines whether the transfer 40 is the center differential locked state or the center differential free state on the basis of the position of the shift fork 97 indicated by the detected signal input from the center differential lock shift sensor 113.

Figure 3:
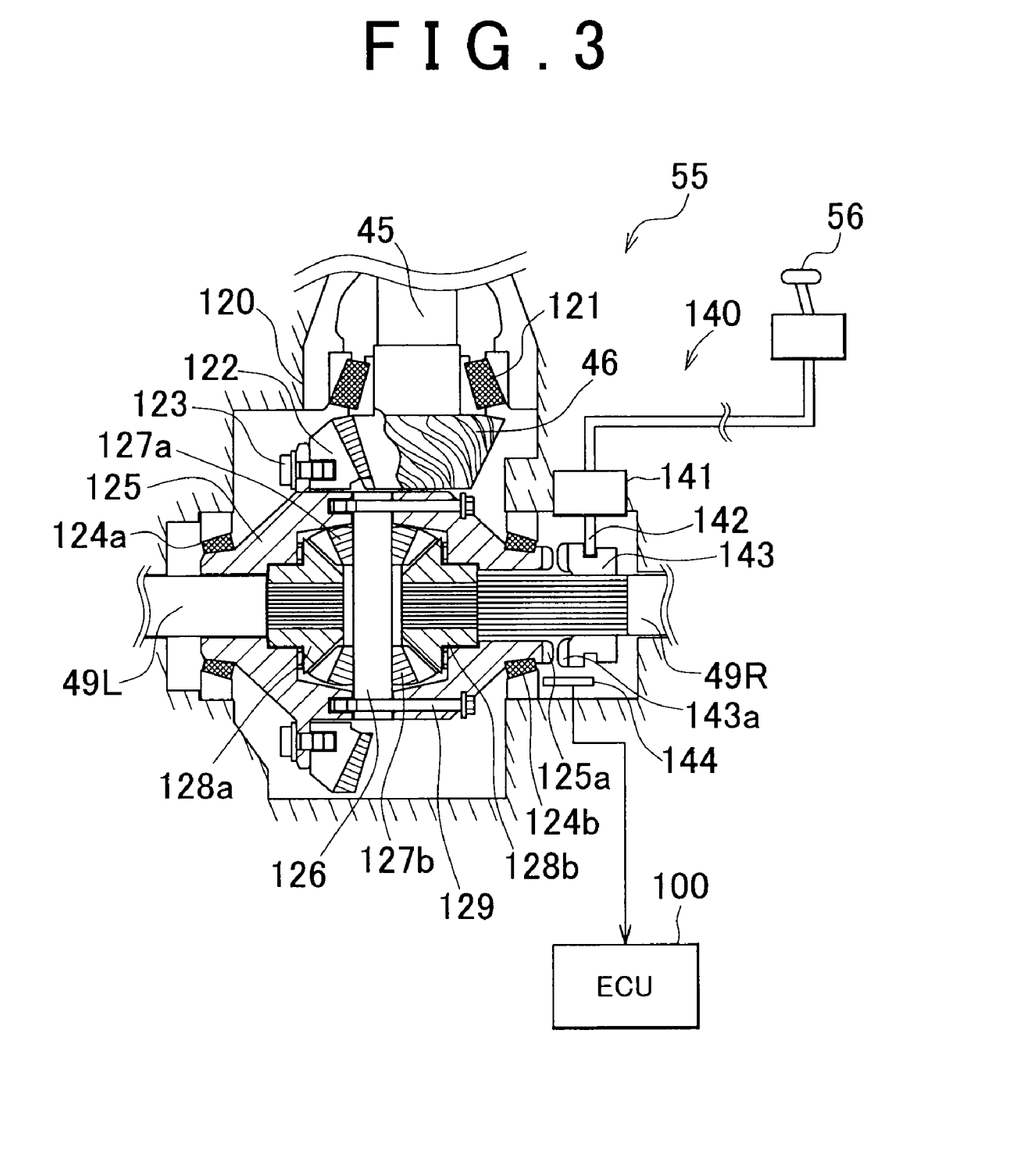
FIG. 3 is a schematic diagram that shows the configuration of a rear differential mechanism according to the embodiment of the invention.

Next, the configuration of the rear differential mechanism 55 will be described with reference to the accompanying drawings. FIG. 3 is a schematic diagram that shows the configuration of the rear differential mechanism according to the embodiment of the invention. As shown in FIG. 3, the rear differential mechanism 55 includes a housing 120, a rear ring gear 122, a rear differential case 125, a rear pinion shaft 126, rear differential pinions 127a and 127b, rear differential side gears 128a and 128b and a rear differential lock mechanism 140. The rear ring gear 122 is in mesh with a rear drive pinion 46. The rear differential pinions 127a and 127b are rotatably fitted to the rear pinion shaft 126. The rear differential side gears 128a and 128b are respectively spline-fitted to the rear drive shafts 49L and 49R and in mesh with the rear differential pinions 127a and 127b. The rear differential lock mechanism 140 prohibits differential motion in the rear differential mechanism 55.

As shown in FIG. 3, the rear differential mechanism 55 is accommodated in the housing 120. In addition, inside the housing 120, the rear propeller shaft 45 for transmitting the power of the engine, transmitted from the transfer 40, to the rear differential mechanism 55 is rotatably supported by the housing 120 via a plurality of taper roller bearings 121.

Furthermore, the rear drive pinion 46 is integrally provided at the axial end of the rear propeller shaft 45 adjacent to the rear differential mechanism 55. The rear drive pinion 46 is, for example, formed of a spiral bevel gear having curved teeth. In addition, the rear drive pinion 46 is in mesh with the rear ring gear 122 having teeth that are in mesh with the spiral bevel gear so that the respective rotational axes are perpendicular to each other with a distance therebetween. Note that the rear drive pinion 46 and the rear ring gear 122 constitute a final gear serving as a final reduction gear that reduces the rotational speed of the rear propeller shaft 45 and transmits the rotation to the rear differential mechanism 55.

The rear ring gear 122 is fixed to a rear differential case 125 by a plurality of fixing bolts 123. Thus, the rear ring gear 122 may be detached from the rear differential case 125 by removing the fixing bolts 123 at the time of maintenance, replacement, or the like.

As shown in FIG. 3, the rear differential case 125 is, for example, divided into two annular case components, and the divided case components are fastened to each other by a plurality of fastening bolts 129. In addition, the rear differential case 125 is rotatably supported at the outer ends in the direction of the rotational axis by the housing 120 via a plurality of taper roller bearings 124a and 124b. Thus, the rear differential case 125 is rotated by the power of the engine 11, transmitted by the rear propeller shaft 45 via the rear drive pinion 46 and the rear ring gear 122.

The rear pinion shaft 126 is arranged between the divided case components of the rear differential case 125. The rear pinion shaft 126 is fastened to the rear differential case 125 by fastening bolts 129.

The rear differential pinions 127a and 127b are provided on the rear pinion shaft 126 in the inner space of the rear differential case 125 so that the rear differential pinions 127a and 127b are rotatable in the circumferential direction of the rear pinion shaft 126 and face each other on the same axis as that of the rear pinion shaft 126.

Furthermore, the rear differential side gears 128a and 128b are accommodated in the inner space of the rear differential case 125 so as to face each other. The rear differential side gears 128a and 128b are respectively fitted at the inner ends (the other ends) thereof to spline grooves provided respectively on the outer peripheral surfaces of the rear drive shafts 49L and 49R. The rear differential side gears 128a and 128b are in mesh with the rear differential pinions 127a and 127b so that the respective rotational axes are perpendicular to each other with a distance therebetween.

In addition, dog teeth 125a are provided on an annular surface that forms one end of the rear differential case 125.

The rear differential lock mechanism 140 establishes or releases a rear differential locked state, which will be described later, in the rear differential mechanism 55. The rear differential lock mechanism 140 includes a rear differential lock actuator 141, a rear differential lock shift fork 142 and a rear differential lock sleeve 143.

The rear differential lock actuator 141 is connected to a rear differential lock shift lever 56 by a mechanical structure (not shown). The rear differential lock shift lever 56 is provided in the vehicle cabin. The rear differential lock actuator 141 is able to establish or release the rear differential locked state by moving the rear differential lock shift fork 142 in the axial direction of the rear drive shaft 49R as the rear differential lock shift lever 56 is operated by the driver.

One end of the rear differential lock shift fork 142 is connected to the rear differential lock actuator 141, and the other end thereof is fitted to a groove formed in the rear differential lock sleeve 143.

The rear differential lock sleeve 143 is an annular component, and has spline-shaped protrusions on the inner peripheral surface thereof in the axial direction. The rear differential lock sleeve 143 allows the inner end of the rear drive shaft 49R to be axially movable and is integrally rotatable with the rear drive shaft 49R in such a manner that these protrusions are fitted to the spline grooves formed at the inner end (the other end) on the outer peripheral surface of the rear drive shaft 49R. In addition, dog teeth 143a are provided on the rear differential lock sleeve 143 so as to face the dog teeth 125a of the rear differential case 125.

Here, a state where differential motion is allowed (rear differential free state) and a state where differential motion is prohibited (rear differential locked state) in the rear differential mechanism 55 will be described.

First, the rear differential free state will be described. For example, when the vehicle equipped with the rear differential mechanism 55 drives on a straight road, the rotational speeds of the rear wheels 59L and 59R are substantially equal to each other. That is, the rotational speeds of the rear drive shafts 49L and 49R are substantially equal to each other. In this case, the rear differential pinions 127a and 127b integrally revolve with the rear differential side gears 128a and 128b without rotating relative to the rear differential side gears 128a and 128b.

On the other hand, for example, when the vehicle 10 drives on a curved road, there occurs a difference in rotational speed between inner and outer wheels due to a difference in turning radius between the inner and outer wheels. If the vehicle 10 is not equipped with the rear differential mechanism 55 and the rear wheels 59L and 59R are provided at both ends of a single drive shaft, for example, the rear wheel 59L, which is the inner wheel, slips like spinning or the rear wheel 59R, which is the outer wheel, is dragged. This causes a problem that the behavior of the vehicle 10 becomes unstable.

However, with the rear differential mechanism 55, the above problem is eliminated as described below. Note that, for the sake of simple description, it is assumed that the vehicle 10 is driving on an extremely curved road, the rotational speed of the rear wheel 59L is zero, and the rear wheel 59R is rotating at a predetermined rotational speed. In this case, because the rear drive shaft 49L coupled to the rear wheel 59L does not rotate, the rear differential side gear 128a that is spline-fitted to the rear drive shaft 49L also does not rotate.

Although the rear differential side gear 128a does not rotate, the rear propeller shaft 45, the rear drive pinion 46, the rear ring gear 122, the rear differential case 125 and the rear pinion shaft 126 continue to rotate by the power from the engine 11.

Thus, the rear differential side gear 128a does not rotate, so the rear differential pinions 127a and 127b that are rotatably attached to the rear pinion shaft 126 continue to revolve while rotating about the rear pinion shaft 126.

The rear differential pinions 127a and 127b continue to revolve while rotating on their axes. Thus, the rear differential side gear 128b that faces the irrotational rear differential side gear 128a via the rear differential pinions 127a and 127b is able to continue rotation. Thus, even when the rear wheel 59L does not rotate, the rear wheel 59R is able to rotate by the driving force of the engine 11.

In this way, when the rear differential mechanism 55 is in the rear differential free state, relative rotation (differential motion) between the rear differential side gears 128a and 128b is allowed, for example, when the vehicle 10 drives on a curved road. Thus, it is possible to stabilize the behavior of the vehicle 10.

Next, the rear differential locked state will be described. For example, when the vehicle equipped with the rear differential mechanism 55 drives on a rugged mountain road, depending on the shape of the roughness, there may be a situation that the rear wheel 59L is in contact with a ground and the rear wheel 59R is spaced apart from the ground.

In this case, the rotational resistance of the rear wheel 59R that is spaced apart from the ground remarkably decreases with respect to the rotational resistance of the rear wheel 59L that is in contact with the ground. That is, the rotational resistance of the rear differential side gear 128b is remarkably smaller than the rotational resistance of the rear differential side gear 128a. In such a case, if the rear differential mechanism 55 is in the above described rear differential free state, the rear differential mechanism 55 revolves the rear differential pinions 127a and 127b while rotating them on their axes to rotate the rear differential side gear 128b having a smaller rotational resistance prior to the rear differential side gear 128a having a large rotational resistance. Thus, the rear differential side gear 128b rotates at a higher rotational speed.

Thus, the driving force of the engine 11 is preferentially transmitted to the rear wheel 59R that is spaced apart from the ground via the rear differential side gear 128b, so the rotational speed of the rear wheel 59R steeply increases, while the driving force transmitted to the rear wheel 59L that is in contact with the ground steeply decreases. Therefore, when the rear wheel 59R that has once separated from the ground contacts the ground again, increased driving force is transmitted to the ground. Thus, the traveling direction of the vehicle 10 deviates rightward, and the behavior of the vehicle 10 becomes unstable.

Then, for example, when the vehicle drives on a rugged mountain road, as the driver shifts the shift position of the rear differential lock shift lever 56 into the shift position corresponding to the rear differential locked state, the rear differential mechanism 55 establishes the rear differential locked state as described below.

That is, as the rear differential lock shift lever 56 is shifted into the shift position corresponding to the rear differential locked state, the rear differential lock actuator 141 slides the rear differential lock sleeve 143 via the rear differential lock shift fork 142 toward the rear differential case 125 to bring the dog teeth 125a into mesh with the dog teeth 143a.

As the dog teeth 125a are in mesh with the dog teeth 143a, the rear differential case 125 and the rear drive shaft 49R integrally rotate. That is, as the dog teeth 125a are in mesh with the dog teeth 143a, the rear differential case 125, the rear differential pinion shaft 126 and the rear differential side gear 128b integrally rotate.

As the rear differential case 125, the rear differential pinion shaft 126 and the rear differential side gear 128b integrally rotate, the rear differential side gears 128a and 128b are not able to rotate relative to each other (differential motion). Thus, the rear differential locked state that prohibits differential motion in the rear differential mechanism 55 is established.

In the rear differential locked state, the driving force of the engine 11, transmitted to the rear differential mechanism 55 via the rear propeller shaft 45, is equally distributed between the rear differential side gears 128a and 128b, so the driving force of the engine 11 is equally transmitted to the rear wheels 59L and 59R as well.

Therefore, even when the rear wheel 59R is distanced from the ground, the driving force of the engine 11 is equally transmitted to the rear wheels 59L and 59R. Thus, when the rear wheel 59R contacts the ground again, the behavior of the vehicle 10 does not become unstable. In this way, the rear differential mechanism 55 may be shifted by the driver between the rear differential free state and the rear differential locked state, so it is possible to attain the driving condition of the vehicle 10 according to a road surface condition.

Here, the rear differential mechanism 55 includes a rear differential lock shift sensor 144. The rear differential lock shift sensor 144 detects the position of the rear differential lock sleeve 143, and inputs the detected signal that indicates the position of the rear differential lock sleeve 143 to the input interface of the ECU 100.

Thus, the ECU 100 determines whether the rear differential mechanism 55 is in the rear differential locked state or the rear differential free state on the basis of the position of the rear differential lock sleeve 143 indicated by the detected signal input from the rear differential lock shift sensor 144.

As described above, the center differential mechanism 80, the rear differential mechanism 55 and the front differential mechanism 50 each are able to enter a differential locked state. Thus, with the above mechanisms, the vehicle 10 is able to selectively establish the differential free state that allows differential motion or the differential locked state that prohibits differential motion for the four drive wheels, that is, the front wheels 57L and 57R and the rear wheels 59L and 59R. Thus, it is possible to obtain desired driving capability in accordance with a road surface condition.

Hereinafter, a characteristic configuration of the vehicle control device according to the present embodiment will be described. The A/T 20 controls a state of power transmitted from the engine 11 and a state of power generated by the engine 11. That is, the A/T 20 constitutes a power control mechanism according to the aspect of the invention.

The transfer 40, the front differential mechanism 50 and the rear differential mechanism 55 shift whether to transmit power from the engine to the front and rear wheels, and also shift whether to allow differential motion of each drive wheel. That is, the transfer 40, the front differential mechanism 50 and the rear differential mechanism 55 constitute a power transfer mechanism according to the aspect of the invention.

The ECU 100 has a plurality of control modes. The ECU 100 selects any one of the control modes to control the A/T 20 in accordance with the selected control mode. In addition, the ECU 100 selects any one of the control modes corresponding to the input vehicle driving mode. Furthermore, when it is determined that shift operation into an operation mode corresponding to the input vehicle driving mode is input through the rear differential lock shift lever 56, the high-low shift lever 110 and the center differential lock shift lever 111, and the operation mode of the transfer 40, front differential mechanism 50 and rear differential mechanism 55 has been shifted by the operating shaft 77, the shift fork 76, the shift fork 97 and the rear differential lock mechanism 140, the ECU 100 shifts a currently set control mode into the control mode corresponding to the input vehicle driving mode. Until it is determined that the shift operation for shifting the operation modes is input, the ECU 100 maintains the control mode set at the time when the vehicle driving mode is input.

Furthermore, when the shift operation into the operation mode corresponding to the input vehicle driving mode is not input through the respective rear differential lock shift lever 56, high-low shift lever 110 and center differential lock shift lever 111 within a predetermined period of time from when a shift instruction is issued, the ECU 100 invalidates the input vehicle driving mode. That is, the ECU 100 constitutes an example of a first control unit according to the aspect of the invention.

The operating shaft 77, the shift fork 76, the shift fork 97 and the rear differential lock mechanism 140 have a plurality of operation modes. The ECU 100 selects any one of the operation modes in accordance with the input shift operation to control the transfer 40, the front differential mechanism 50 and the rear differential mechanism 55 in accordance with the selected operation mode. That is, the operating shaft 77, the shift fork 76, the shift fork 97 and the rear differential lock mechanism 140 constitute an example of a second control unit according to the aspect of the invention.

Note that, in the present embodiment, the second control unit mechanically controls the transfer 40, the front differential mechanism 50 and the rear differential mechanism 55; instead, for example, the second control unit may employ a shift-by-wire system that electrically controls the transfer 40, the front differential mechanism 50 and the rear differential mechanism 55 on the basis of an input signal.

The rear differential lock shift lever 56, the high-low shift lever 110 and the center differential lock shift lever 111 are used to input shift operation for shifting operation modes. That is, the rear differential lock shift lever 56, the high-low shift lever 110 and the center differential lock shift lever 111 constitute an example of an operation mode shifting device according to the aspect of the invention.

The operation panel 51 allows the driver to input a vehicle driving mode formed of any one of the operation modes and any one of the control modes. That is, the operation panel 51 constitutes an example of a third control unit according to the aspect of the invention.

The ECU 100 outputs a shift instruction for instructing the driver to perform shift operation for shifting the currently set operation mode into the operation mode corresponding to the input vehicle driving mode. That is, the ECU 100 constitutes an example of the third control unit according to the aspect of the invention.

Furthermore, the ECU 100 determines whether shift operation for shifting the transfer 40, the front differential mechanism 50 and the rear differential mechanism 55 into the operation mode corresponding to the input vehicle driving mode is input by the rear differential lock shift lever 56, the high-low shift lever 110 and the center differential lock shift lever 111. That is, the ECU 100 constitutes an example of the third control unit according to the aspect of the invention.

Figure 4:
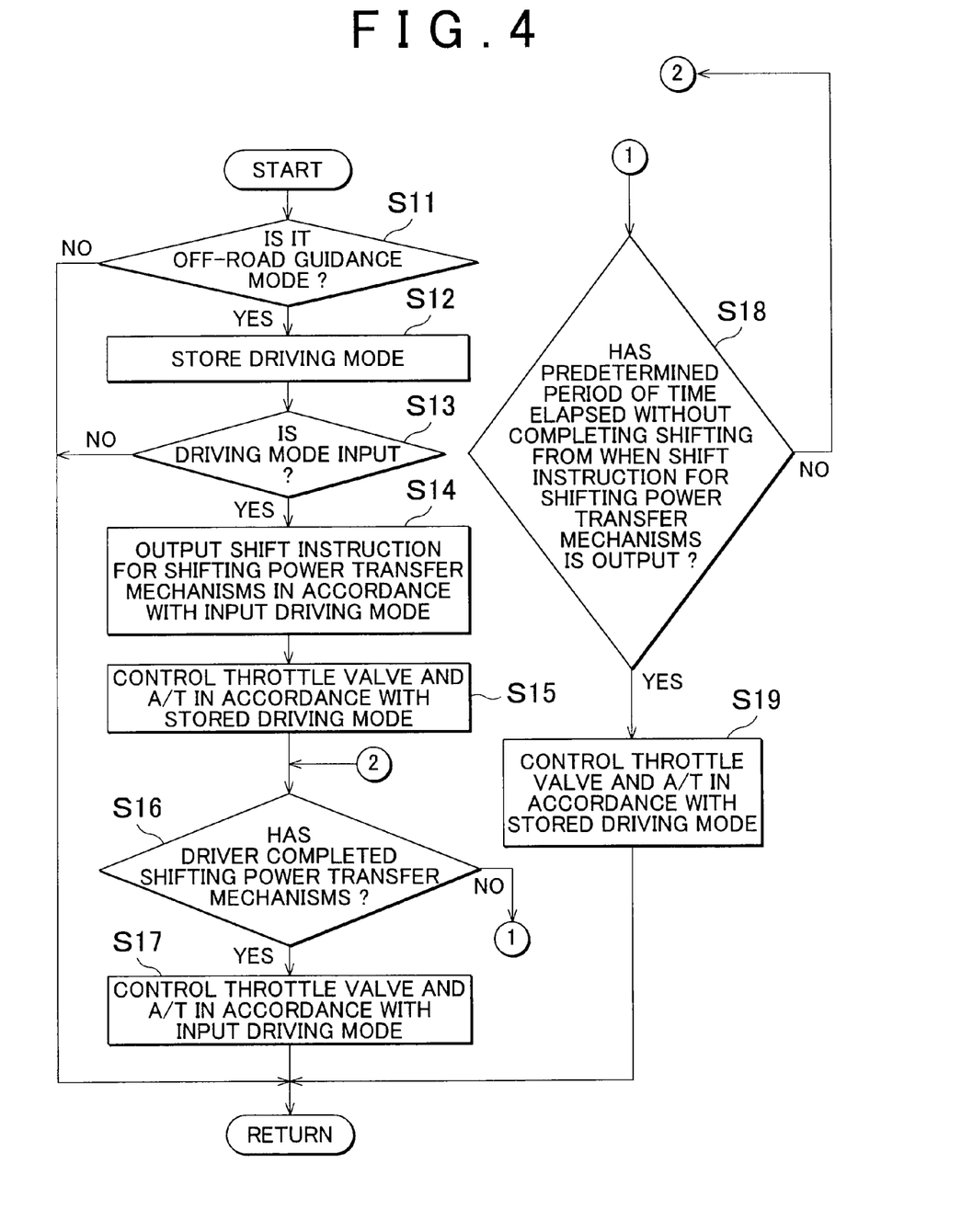
FIG. 4 is a flowchart that shows a driving mode shifting process in the vehicle control device according to the embodiment of the invention.
Figure 5A:
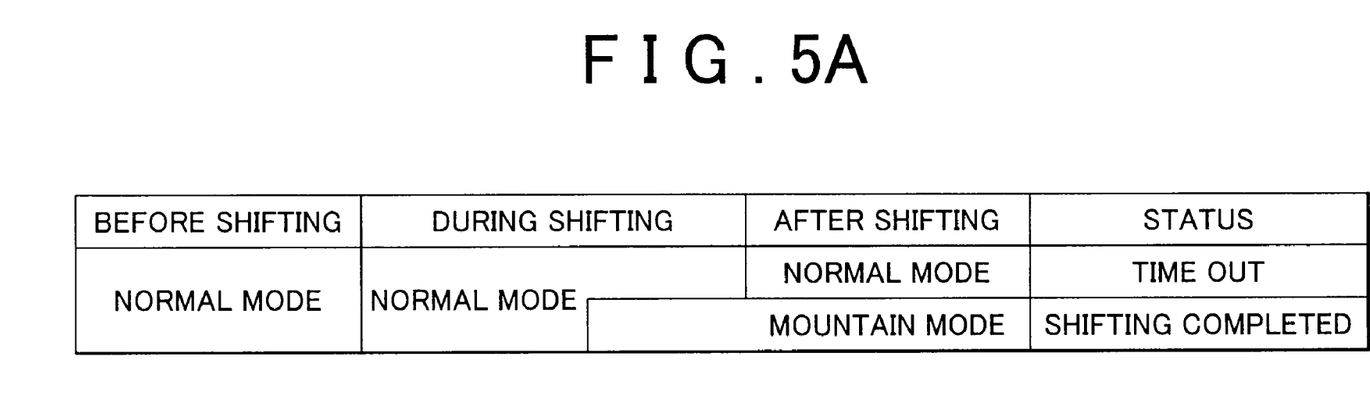
FIG. 5A is a schematic view that shows a shifting state where the driving mode is shifted from a normal mode to a mountain mode according to the embodiment of the invention.
Figure 5B:
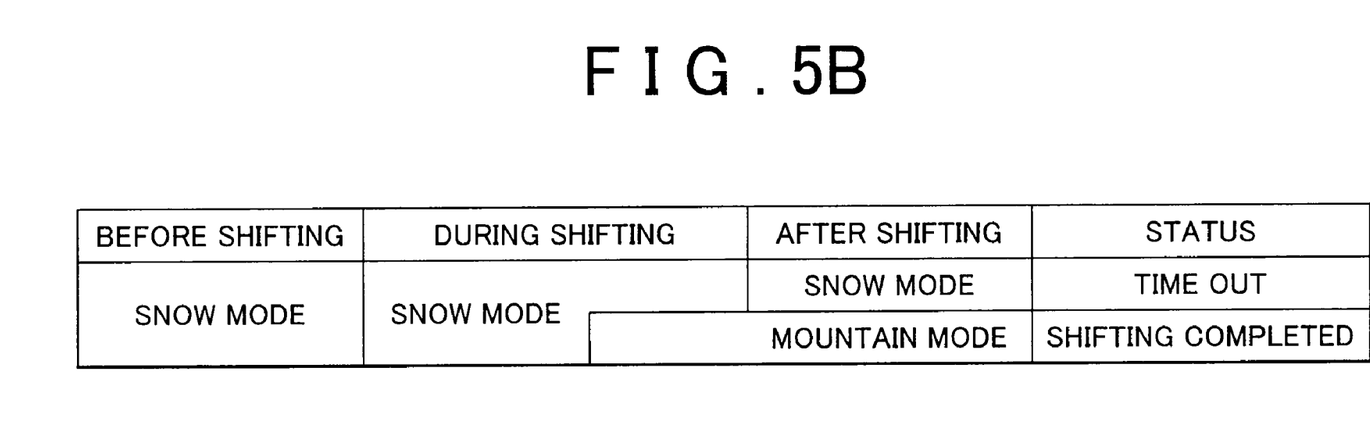
FIG. 5B is a schematic view that shows a shifting state where the driving mode is shifted from a snow mode to a mountain mode according to the embodiment of the invention.

Next, the operation of the vehicle control device according to the present embodiment will be described with reference to the accompanying drawings. FIG. 4 is a flowchart that shows a driving mode shifting process in the vehicle control device according to the embodiment of the invention. In addition, FIG. 5A and FIG. 5B are schematic views that show a shifting state of the driving mode according to the embodiment of the invention. FIG. 5A is a schematic view that shows a shifting state where the driving mode is shifted from a normal mode to a mountain mode according to the embodiment of the invention. FIG. 5B is a schematic view that shows a shifting state where the driving mode is shifted from a snow mode to a mountain mode according to the embodiment of the invention. Furthermore, FIG. 6 is a map that shows the opening degree characteristic of a throttle valve in each driving mode according to the embodiment of the invention.

Note that the flowchart shown in FIG. 4 shows the content of a program of the driving mode shifting process executed by the CPU of the ECU 100 using the RAM as a work area. The program of the driving mode shifting process is stored in the ROM of the ECU 100. In addition, the driving mode shifting process is executed at predetermined time intervals (for example, 100 milliseconds) by the CPU of the ECU 100.

Figure 6:
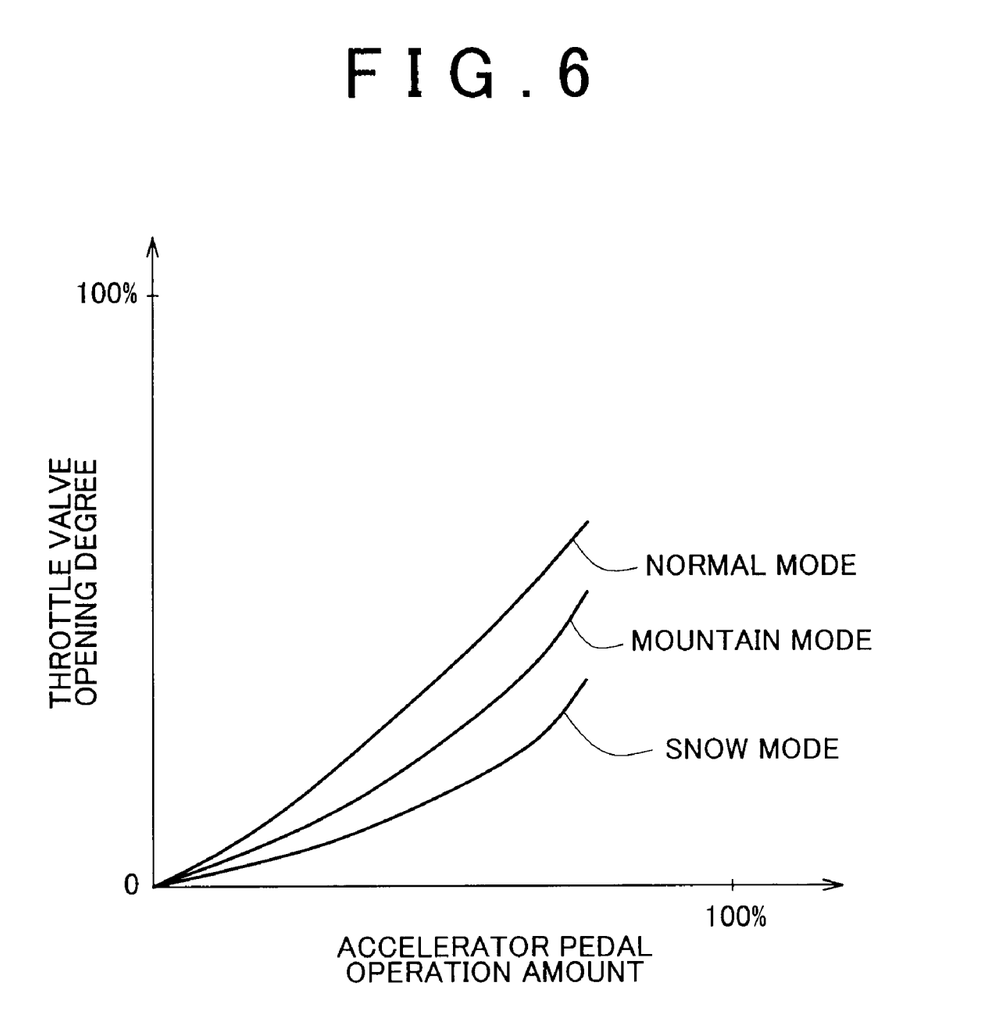
FIG. 6 is a map that shows the opening degree characteristic of a throttle valve in each driving mode according to the embodiment of the invention.

In addition, the opening degree characteristic of the throttle valve of each driving mode shown in FIG. 6 shows a map stored in the ROM of the ECU 100. The CPU of the ECU 100 adjusts the opening degree of the throttle valve in each driving mode in accordance with the driving mode shown in FIG. 6.

As shown in FIG. 4, the CPU of the ECU 100 initially determines whether the control status of the vehicle 10 is an off-road guidance mode (step S11). The off-road guidance mode indicates a control mode of the vehicle 10, input through the operation panel 51 operated by the driver. In the off-road guidance mode, the CPU of the ECU 100 instructs the driver to shift the front differential mechanism 50, the rear differential mechanism 55 and the transfer 40 on the basis of the driving mode input by the driver, and, as the driver completes the shifting, the CPU switches the opening degree characteristic of the throttle valve shown in FIG. 6 and the shift characteristic of the A/T 20 in accordance with the driving mode.

Next, when the CPU of the ECU 100 determines that the control status of the vehicle 10 is the off-road guidance mode (Yes in step S11), the CPU stores the currently set driving mode of the vehicle 10 (step S12). On the other hand, when the CPU of the ECU 100 determines that the control status of the vehicle 10 is not the off-road guidance mode (No in step S11), it is not necessary to execute the driving mode shifting process, so the process ends.

For example, when the current driving mode is a normal mode for driving on an on road, the CPU of the ECU 100 stores the driving mode as the normal mode (step S12), and then determines whether a driving mode is input (step S13). Specifically, when the CPU of the ECU 100 has detected a signal that indicates a driving mode input through the operation panel 51, the CPU determines that a driving mode is input (Yes in step S13).

When the CPU of the ECU 100 determines that a driving mode is input (Yes in step S13), the CPU instructs the driver to shift the power transfer mechanisms, such as the transfer 40, the front differential mechanism 50 and the rear differential mechanism 55, on the basis of the input driving mode (step S14). Note that in the specification, when a driving mode is input so as to shift from a normal mode into a mountain mode, the following process will be described (see FIG. 5A).

When a driving mode is input so as to shift from the normal mode into the mountain mode, the CPU of the ECU 100 instructs the driver by indicating, on the operation panel 51, that the gear of the transfer 40 is shifted from Hi to Lo, the transfer 40 is shifted into the center differential locked state, the front differential mechanism 50 is shifted into the front differential locked state, and the rear differential mechanism 55 is shifted into the rear differential locked state (step S14).

Note that, as the CPU of the ECU 100 instructs the driver to shift the power transfer mechanism, the shifting state of the driving mode enters a state corresponding to "during shifting" in FIG. 5A.

Here, an instruction is issued to the driver to shift the transfer 40 as described above when the driving mode is input to shift into the mountain mode is because of the following reason. That is, the gear of the transfer 40 is shifted from Hi to Lo to reduce the speed ratio, increase the torque transmitted to the front wheels 57L and 57R and the rear wheels 59L and 59R and then make it easy to pass over a slope or an obstacle.

Furthermore, by shifting the transfer 40, the front differential mechanism 50 and the rear differential mechanism 55 into the differential locked state, when any of drive wheels is not in contact with a ground, power is reliably transmitted to the other drive wheels to improve driving capability for a mountain road.

Next, the CPU of the ECU 100 instructs the driver to shift the power transfer mechanisms (step S14), and then controls the throttle valve and the A/T 20 on the basis of the normal mode, which is the stored driving mode (step S15). That is, as shown in FIG. 5A, when the shifting state of the driving mode is "during shifting", the CPU of the ECU 100 controls the throttle valve in accordance with the opening degree characteristic corresponding to the normal mode shown in FIG. 6, and controls the A/T 20 in accordance with the shift characteristic corresponding to the normal mode. Here, the shift characteristic of the A/T 20 indicates the shift timing of each speed ratio of the A/T 20 based on an engine rotational speed, a vehicle speed, and the like.

Next, the CPU of the ECU 100 determines whether the driver has completed shifting the power transfer mechanisms (step S16). Specifically, the CPU of the ECU 100 uses the high-low shift sensor 112 to detect whether the gear of the transfer 40 is Lo, and uses the center differential lock shift sensor 113 to detect whether the transfer 40 is the center differential locked state. Furthermore, the CPU of the ECU 100 uses the rear differential lock shift sensor 144 to detect whether the rear differential mechanism 55 is the rear differential locked state, and uses a front differential lock shift sensor (not shown) to detect whether the front differential mechanism 50 is the front differential locked state.

When the CPU of the ECU 100 determines that the driver has completed shifting all the transfer 40, the front differential mechanism 50 and the rear differential mechanism 55 on the basis of the detected results, the CPU determines that the driver has completed shifting the power transfer mechanisms (Yes in step S16). On the other hand, when the CPU of the ECU 100 determines that the driver has not completed shifting any of the transfer 40, the front differential mechanism 50 and the rear differential mechanism 55 on the basis of the detected results, the CPU does not determine that the driver has completed shifting the power transfer mechanisms (No in step S16).

Subsequently, when the CPU of the ECU 100 determines that the driver has completed shifting the power transfer mechanism (Yes in step S16), the CPU switches the opening degree characteristic of the throttle valve shown in FIG. 6 and switches the shift characteristic of the A/T 20 against an accelerator operation amount or a speed in accordance with a mountain mode, which is the input driving mode, after which the process ends (step S17).

That is, when the CPU of the ECU 100 determines that the driver has completed shifting the power transfer mechanisms (Yes in step S16), and when the CPU has completed switching the opening degree characteristic of the throttle valve and the shift characteristic of the A/T 20 (step S17), the shifting state of the driving mode enters a state corresponding to "after shifting" in FIG. 5A. Then, the status of the shifting state becomes "complete shifting", and the driving mode is fixed to the mountain mode.

Here, the opening degree characteristic of the throttle valve corresponding to the mountain mode will be described with reference to FIG. 6. The gradient of the curve of the opening degree characteristic of the throttle valve is smaller in the mountain mode than in the normal mode. When the vehicle 10 drives on a mountain road, it may be presumable that the vehicle 10 needs to pass over many obstacles, such as rock and roughness, on a steep slope, so the driver is required to perform advanced handling and power control. Therefore, the ratio of the opening degree of the throttle valve to the operation amount of the accelerator pedal is reduced to allow minute power control.

On the other hand, when the CPU of the ECU 100 does not determine that the driver has completed shifting the power transfer mechanisms (No in step S16), the CPU determines whether a predetermined period of time (for example, 30 seconds) has elapsed without completing shifting from time (step S14) at which a shift instruction for shifting the power transfer mechanisms is issued to the driver (step S18).

When the CPU of the ECU 100 determines that the predetermined period of time has elapsed without completing shifting from time at which a shift instruction for shifting the power transfer mechanisms is issued to the driver (Yes in step S18), the CPU determines that it is time out, and maintains the opening degree characteristic of the throttle valve and the shift characteristic of the A/T 20 at the opening degree characteristic and shift characteristic corresponding to the normal mode, which is the stored driving mode (step S12), after which the process ends (step S19).

That is, when the CPU of the ECU 100 determines that it is time out, the shifting state of the driving mode enters a state corresponding to "after shifting" in FIG. 5A. Then, the status of the shifting state becomes "time out", and the driving mode is fixed to the normal mode.

On the other hand, when the CPU of the ECU 100 determines that the predetermined period of time has not yet elapsed from time at which a shift instruction for shifting the power transfer mechanisms is issued to the driver without completing shifting (No in step S18), the CPU determines again whether the driver has completed shifting the power transfer mechanisms (step S16). That is, unless the CPU of the ECU 100 determines that the driver has completed shifting the power transfer mechanisms (No in step S16), the CPU repeats determination as to whether the predetermined period of time has elapsed from time at which a shift instruction for shifting the power transfer mechanisms is issued to the driver without completing shifting (step S18).

Note that it is also applicable that, when the CPU of the ECU 100 determines that it is time out, in order to avoid continuing an unstable state where the driving mode is not fixed, the CPU issues an error message to cancel the shift operation of the power transfer mechanisms, such as the transfer 40, the front differential mechanism 50 and the rear differential mechanism 55, so as to invalidate the input driving mode, after which the process ends. In this case, after the error message disappears, the driver may input a driving mode again through the operation panel 51.

As described above, the vehicle control device according to the present embodiment maintains the opening degree characteristic of the throttle valve and the shift characteristic of the A/T 20 at the characteristics that have been already set at the time of input until the operation mode of the power transfer mechanisms is shifted into the operation mode corresponding to the input driving mode to thereby make it possible to prevent an unnecessary shift of control. Thus, deterioration of drivability may be prevented.

In addition, the vehicle control device according to the present embodiment is able to suppress an increase in production cost, and may be retrofitted to an existing four-wheel drive vehicle at low cost.

As described above, the vehicle control device according to the aspect of the invention is advantageously able to execute electronic control in cooperation with the power transfer mechanisms by preventing deterioration of drivability without increasing cost as compared with an existing vehicle. The vehicle control device according to the aspect of the invention is useful as a vehicle control device that executes electronic control in cooperation with the power transfer mechanisms.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the scope of the invention.

What is claimed is:

1. A vehicle control device comprising:
a power control mechanism that controls a state of power transmitted from an engine and a state of power generated by the engine;
a power transfer mechanism that shifts distribution of power from the engine and that shifts whether to allow differential motion of each drive wheel;
a first control unit that has a plurality of control modes and that selects any one of the control modes from among the plurality of control modes to control the power control mechanism in accordance with the selected control mode;
a second control unit that has a plurality of operation modes and that selects any one of the operation modes from among the plurality of operation modes in accordance with input shift operation to control the power transfer mechanism in accordance with the selected operation mode;
an operation mode shifting device that is used to input the shift operation for shifting the operation modes; and
a third control unit that allows a vehicle driving mode, formed of any one of the operation modes and any one of the control modes, to input, that outputs a shift instruction for performing the shift operation for shifting any one of the operation modes into another one of the operation modes corresponding to the input vehicle driving mode, and that determines whether the shift operation for shifting the power transfer mechanism into the operation mode corresponding to the input vehicle driving mode has been input through the operation mode shifting device,
wherein the first control unit selects any one of the control modes corresponding to the input vehicle driving mode, and, when the third control unit determines that the shift operation for shifting into the operation mode corresponding to the input vehicle driving mode has been input through the operation mode shifting device and when the second control unit has completed shifting the power transfer mechanism into the operation mode corresponding to the input vehicle driving mode, the first control unit shifts any one of the control modes into the control mode corresponding to the input vehicle driving mode, and
wherein until the third control unit determines that the shift operation for shifting the operation modes has been input, the first control unit maintains the control mode at a time of input of the vehicle driving mode.

2. The vehicle control device according to claim 1, wherein when the third control unit determines that the shift operation for shifting into the operation mode corresponding to the input vehicle driving mode has not been input through the operation mode shifting device within a predetermined period of time from when the shift instruction is output by the third control unit, the first control unit invalidates the input vehicle driving mode.

3. The vehicle control device according to claim 1, wherein the power control mechanism includes an automatic transmission that reduces or increases a rotational speed of an output shaft of the engine, which is input by selecting any one of a plurality of power transmission paths from the engine, to transmit the rotational speed to drive wheels; and a throttle that changes a flow rate of air supplied to the engine.

4. The vehicle control device according to claim 1, wherein the power transfer mechanism includes a transfer that distributes power, generated by the engine, between front wheels and rear wheels so as to allow differential motion and that reduces or increases an input rotational speed of an output shaft of the engine to transmit the rotational speed to the drive wheels; and a differential mechanism that distributes the power between left and right drive wheels so as to allow differential motion.

* * * * *